(12) United States Patent
Hano et al.

(10) Patent No.: US 9,035,588 B2
(45) Date of Patent: May 19, 2015

(54) BRUSHLESS MOTOR DRIVING APPARATUS AND BRUSHLESS MOTOR DRIVING METHOD

(75) Inventors: Masaki Hano, Isesaki (JP); Naoki Okamoto, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 114 days.

(21) Appl. No.: 13/614,380

(22) Filed: Sep. 13, 2012

(65) Prior Publication Data

US 2013/0069575 A1  Mar. 21, 2013

(30) Foreign Application Priority Data

Sep. 21, 2011 (JP) .................................. 2011-205654

(51) Int. Cl.
*H02P 6/18* (2006.01)
*H02P 6/16* (2006.01)

(52) U.S. Cl.
CPC ................ *H02P 6/165* (2013.01); *H02P 6/181* (2013.01); *H02P 6/182* (2013.01)

(58) Field of Classification Search
CPC ....... H02P 6/182; H02P 6/142; H02P 25/026; H02P 29/0061; H02P 6/14; H02P 27/06; H02P 6/147; H02H 7/0851
USPC ............. 318/400.34, 400.01, 400.26, 400.32, 318/722, 434, 708, 471, 498, 504
See application file for complete search history.

(56) References Cited

U.S. PATENT DOCUMENTS

| | | | |
|---|---|---|---|
| 5,845,045 A | 12/1998 | Jeske et al. | |
| 6,232,730 B1 * | 5/2001 | Doyama et al. | 318/400.04 |
| 6,661,192 B2 * | 12/2003 | Copeland | 318/400.35 |
| 6,879,129 B2 * | 4/2005 | Tazawa et al. | 318/727 |
| 7,095,204 B2 * | 8/2006 | Lee et al. | 318/700 |
| 7,122,980 B2 * | 10/2006 | Kuroshima et al. | 318/400.11 |
| 7,239,098 B2 * | 7/2007 | Masino | 318/400.35 |
| 7,839,107 B2 * | 11/2010 | Sauter et al. | 318/400.35 |
| 8,076,898 B2 * | 12/2011 | Sagalovskiiy et al. | 318/802 |
| 8,258,732 B2 | 9/2012 | Iwaji et al. | |
| 8,314,577 B2 * | 11/2012 | Takeuchi et al. | 318/400.29 |
| 8,395,344 B2 * | 3/2013 | Takeuchi | 318/599 |
| 8,400,086 B2 * | 3/2013 | Cheng | 318/400.02 |
| 2009/0200971 A1 | 8/2009 | Iwaji et al. | |

FOREIGN PATENT DOCUMENTS

| | | |
|---|---|---|
| DE | 44 41 372 A1 | 6/1995 |
| DE | 10 2006 026 560 A1 | 12/2007 |
| JP | 08-182374 | 7/1996 |
| JP | 09-294391 | 11/1997 |
| JP | 11-032498 | 2/1999 |
| JP | 2000-023487 A | 1/2000 |
| JP | 2009-189176 A | 8/2009 |

* cited by examiner

*Primary Examiner* — Bentsu Ro
*Assistant Examiner* — Thai Dinh
(74) *Attorney, Agent, or Firm* — Foley & Lardner LLP

(57) ABSTRACT

A brushless motor driving apparatus that rotates and drives a brushless motor, which has a plurality of coils, by switching energization modes corresponding to phases of the brushless motor, sequentially switches the energization modes based on a non-energized phase voltage and a voltage threshold. Also, the brushless motor driving apparatus regulates an upper threshold for energization amount based on the voltage threshold and a change in the non-energized phase voltage at timing of switching the energization mode.

19 Claims, 11 Drawing Sheets

BRUSHLESS MOTOR DRIVING APPARATUS AND BRUSHLESS MOTOR DRIVING METHOD

BACKGROUND OF THE INVENTION

1. Field of the Invention

The present invention relates to a brushless motor driving apparatus and a brushless motor driving method.

2. Description of Related Art

As a technique for driving a brushless motor at low speed without a sensor, one in which energization mode is switched according to induced voltage (magnetic saturation voltage) in a non-energized phase has been proposed, as described in JP 2009-189176 A.

However, in a brushless motor drive technique as described above, there is a possibility that the duty ratio for a PWM (Pulse Width Modulation) control increases, thereby causing synchronism loss in the brushless motor. That is, in a state in which the brushless motor is feedback-controlled in an extremely low speed area, when a brushless motor does not reach a target rotational speed due to, for example, a high load, control is performed to increase the duty ratio. In this case, electric current also increases with the increase in the duty ratio of the brushless motor. Accordingly, it is necessary to limit the electric current.

There are two types of electric current; one is phase current, and the other is power source electric current. When a load is high, the phase current is limited earlier than the other. In a state in which the phase current is limited, rotational speed of the brushless motor gradually increases or coil resistance increases due to a coil temperature increase, so that the duty ratio or power source electric current increases with respect to the same phase electric current. As a result, a rate of change in magnetic flux between the energized phases decreases, and hence an induced voltage decreases. Consequently, energization modes for the brushless motor fail to switch with appropriate timing so that synchronism loss is caused in the brushless motor.

SUMMARY OF THE INVENTION

A brushless motor driving apparatus that rotates and drives a brushless motor, which has a plurality of coils, by switching energization modes corresponding to phases of the brushless motor, sequentially switches the energization modes based on voltage change in a non-energized phase and a voltage threshold. Also, the brushless motor driving apparatus regulates an upper threshold for energization amount based on the voltage threshold and change in the non-energized phase voltage at timing of switching the energization mode.

Additional objects and various other aspects of the present invention will be obvious from the description of the embodiments relating to the accompanying drawings.

DESCRIPTION OF THE PREFERRED EMBODIMENTS

Hereinafter an embodiment of the present invention will explained in detail with reference to the attached drawings.

Figure 1:
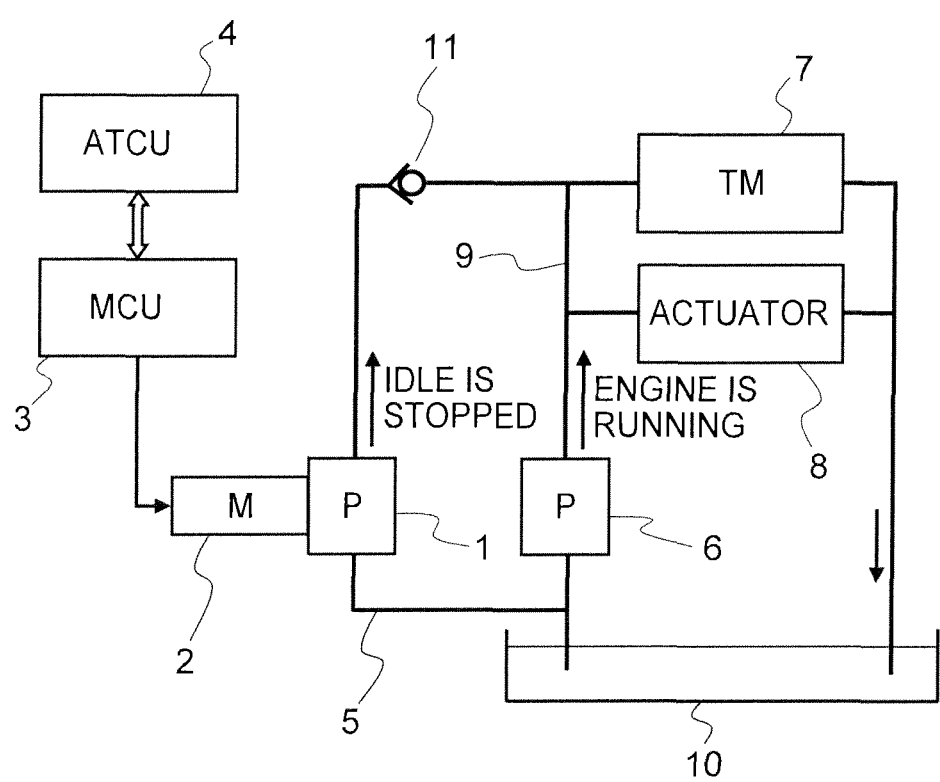
FIG. 1 is a schematic view of the configuration of a hydraulic pump system for vehicle AT (Automatic Transmission)

FIG. 1 is a schematic view of a hydraulic pump system for a vehicle AT, as an example of the systems in which a brushless motor driving apparatus is applied.

For use as an oil pump for supplying oil to a transmission 7 and an actuator 8, the hydraulic pump system for the vehicle AT includes: a mechanical oil pump 6 which is driven by output from an engine (not illustrated); and a motor-driven oil pump 1 which is driven by a motor.

A control system for the engine includes an idle stop control mechanism that stops the engine when conditions for automatic stop are satisfied and restarts the engine when conditions for automatic start are satisfied. While the engine is stopped by stopping idle, the operation of mechanical oil pump 6 is also stopped. Therefore, during idle stop, motor-driven oil pump 1 is actuated to supply oil to transmission 7 and actuator 8.

Motor-driven oil pump 1 is driven by a brushless motor (three-phase synchronous motor) 2 directly connected thereto. Brushless motor 2 is controlled by a motor control unit (MCU) 3 based on a command from an AT control unit (ATCT) 4.

Motor control unit (drive unit) 3 drives and controls brushless motor 2, thereby driving motor-driven oil pump 1. Thus, oil in an oil pan 10 is supplied to transmission 7 and actuator 8 via electric oil piping 5.

While the engine is running, oil in oil pan 10 is supplied, via oil piping 9, to transmission 7 and actuator 8 by mechanical oil pump 6 provided for driving the engine. At this time, the brushless motor 2 is off (stopped) and oil to be supplied to motor-driven oil pump 1 is shut off by a check valve 11.

When the engine stops idling, the rotational speed of mechanical oil pump 6 decreases and hence oil pressure in oil piping 9 decreases. Therefore, a command to actuate the motor is transmitted to motor control unit 3 by AT control unit 4 in synchronization with the engine idle stop.

Having received this actuating command, motor control unit 3 actuates brushless motor 2, thereby driving motor-driven oil pump 1, and starts supplying of oil by motor-driven oil pump 1.

When the discharge pressure of motor-driven oil pump 1 exceeds the valve-opening pressure of check valve 11 while the discharge pressure of mechanical oil pump 6 decreases, oil circulates through the passages of electric oil piping 5, electric oil pump 1, check valve 11, transmission 7, actuator 8, and oil pan 10.

In the embodiment, brushless motor 2 drives motor-driven oil pump 1 of the hydraulic pump system. However, brushless motor 2 may serve as a brushless motor or the like for driving an electric water pump used to circulate coolant for an engine in a hybrid vehicle or the like. Therefore, apparatus to be driven by brushless motor 2 are not limited to oil pumps.

Figure 2:
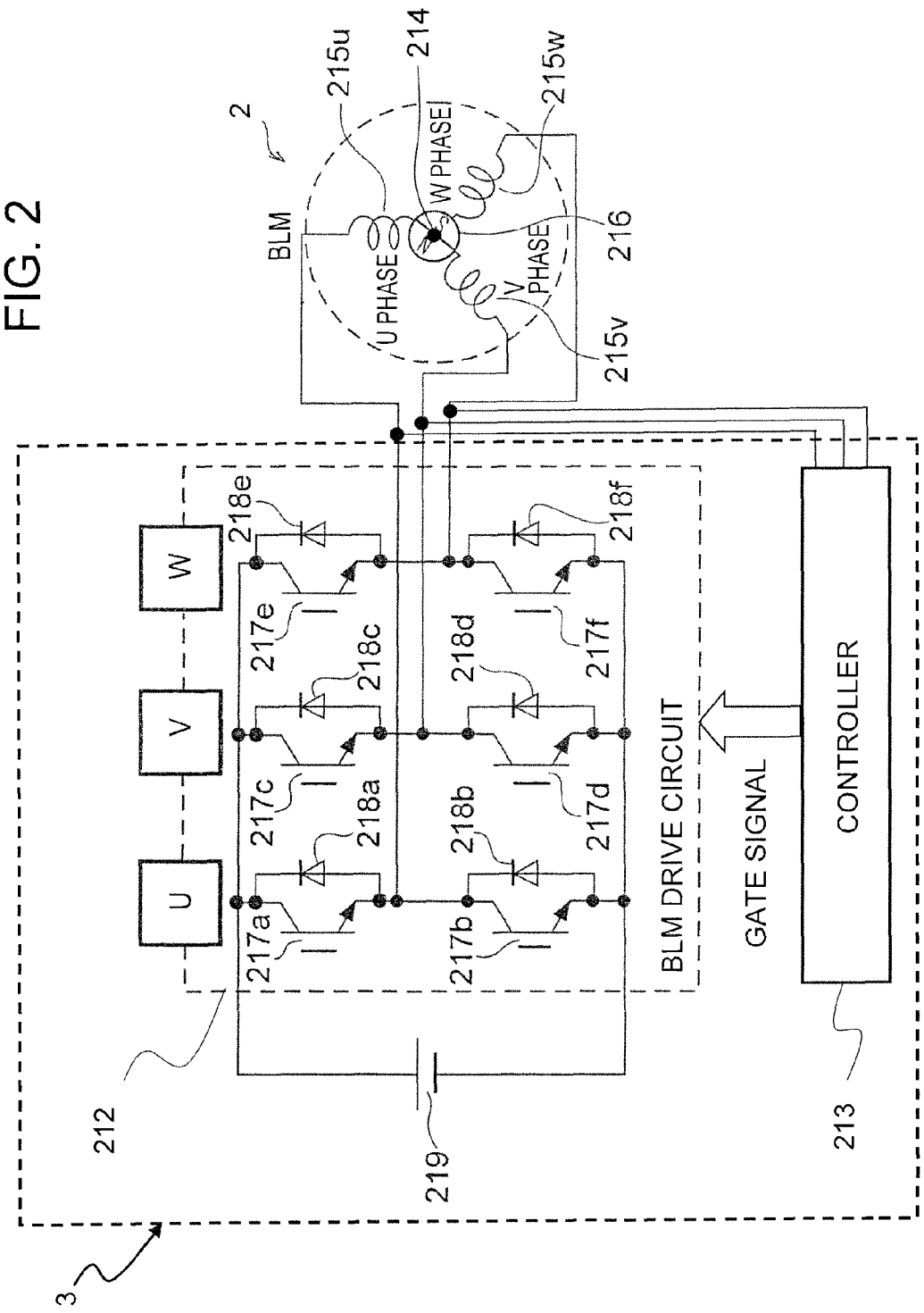
FIG. 2 is a circuit view illustrating the configurations of a motor control unit and a brushless motor.

FIG. 2 is a detailed view of motor control unit 3 and brushless motor 2.

Motor control unit 3 includes a motor drive circuit 212 and a controller 213 incorporating a computer. Controller 213 communicates with AT control system 4.

Brushless motor 2 is a three-phase Direct Current (DC) brushless motor (i.e., three-phase synchronous motor). Three-phase coils 215u, 215v, and 215w, which are for U, V, and W phases, are wound around a cylindrical stator (not illustrated), and a permanent magnet rotor 216 is rotatably disposed in a space defined in a central part of the stator. In this case, the point at which the three-phase coils 215u, 215v, and 215w are connected together in the shape of a letter Y is called a neutral point 214.

Motor drive circuit 212 is configured such that six switching elements 217a to 217f, formed from IGBT (Insulated Gate Bipolar Transistors), are connected in the form of a three-phase bridge and diodes 218a to 218f are connected to switching elements 217a to 217f, respectively, in reverse parallel. Motor control unit 3 has a power circuit 219 that supplies power to motor drive circuit 212.

Control terminals (gate terminals) for switching elements 217a to 217f are connected to controller 213, and the turning on/off of switching elements 217a to 217f is controlled by a pulse width modulation (PWM) operation performed by controller 213.

Controller 213 controls the driving of brushless motor 2 by outputting a pulse width modulation signal (PWL signal) to motor drive circuit 212 while sequentially switching energization modes based on a voltage threshold and an induced voltage in a non-energized phase.

The induced voltage (pulse induced voltage) is a voltage induced in a non-energized phase by application of a pulse voltage to each of two phases. According to a rotor position (magnetic pole position), the saturated state of a magnetic circuit changes, and consequently an induced voltage corresponding to the rotor position is generated in a non-energized phase. This makes it possible to detect the timing of switching the energization modes by estimating the rotor position from the induced voltage in the non-energized phase. The energization modes indicate a two-phase selection pattern to apply the pulse voltage, of three phases.

Figure 3:
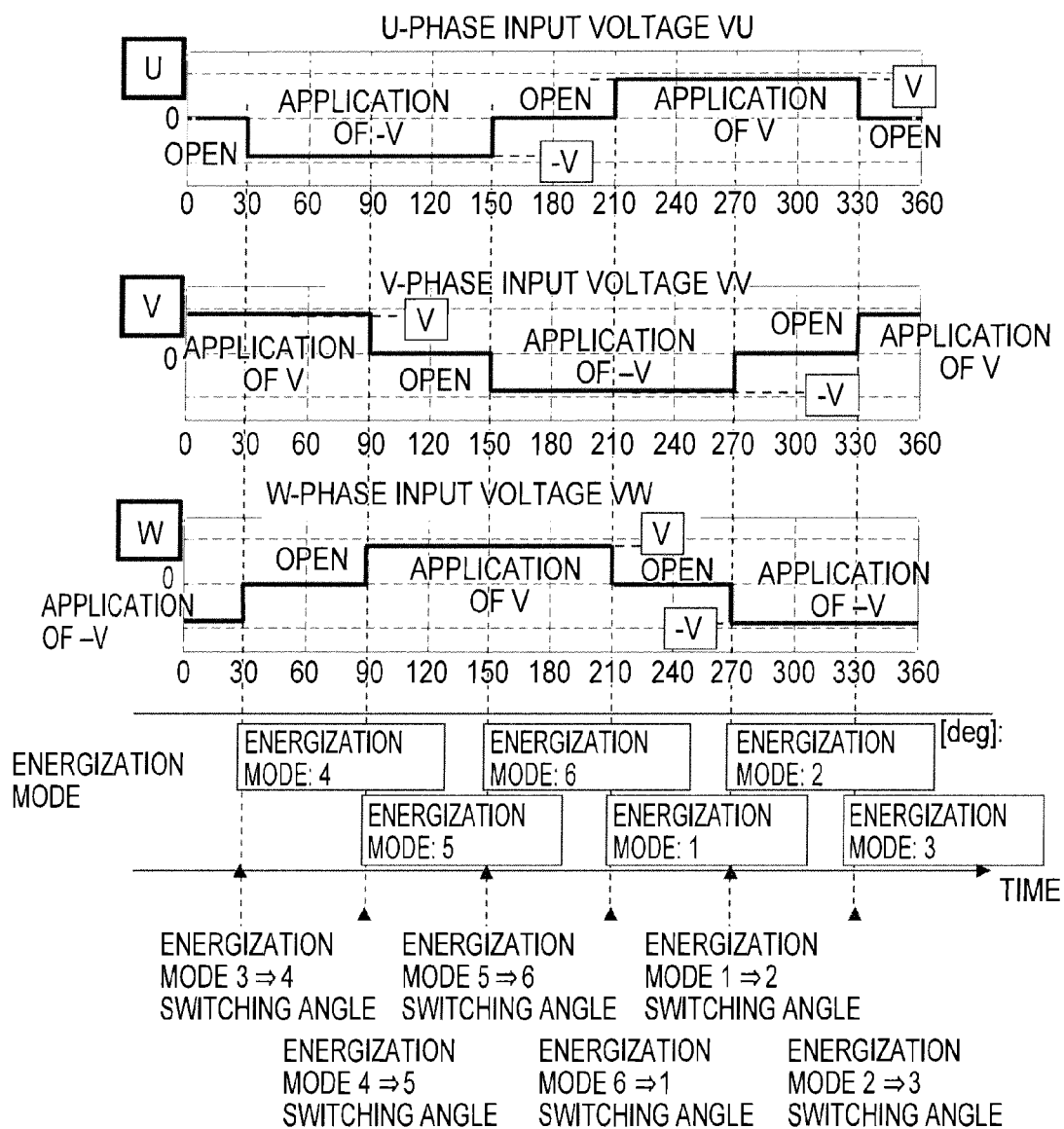
FIG. 3 is a time chart illustrating energization patterns for the brushless motor.

FIG. 3 illustrates application of a voltage to each phase in each of the energization modes.

The energization modes includes six different energization modes (1) to (6), which are switched sequentially every 60 degrees of electric angle. In each of energization modes (1) to (6), pulse voltage is applied to two phases selected from among the three phases.

In the present embodiment, the position at which the N pole of permanent magnet rotor 216 faces a U-phase coil is assumed to be 0 degrees. In this case, the position of the angle of the rotor (i.e., the position of the magnetic pole) that carries out switching from energization mode (3) to energization mode (4) is set at 30 degrees; from energization mode (4) to energization mode (5), at 90 degrees; from energization mode (5) to energization mode (6), at 150 degrees; from energization mode (6) to energization mode (1), at 210 degrees; from energization mode (1) to energization mode (2), at 270 degrees; and from energization mode (2) to energization mode (3), at 330 degrees.

In energization mode (1), control is performed such that switching elements 217a and 217d are turned on and all the other switching elements are turned off, thereby applying a voltage V to a U phase at neutral point 214, applying a voltage −V to a V phase at neutral point 214, and causing a current to flow from U phase to V phase.

In energization mode (2), control is performed such that switching elements 217a and 217f are turned on and all the other switching elements are turned off, thereby applying voltage V to U phase at neutral point 214, applying voltage −V to a W phase at neutral point 214, and causing a current to flow from U phase to W phase.

In energization mode (3), control is performed such that switching elements 217c and 217f are turned on and all the other switching elements are turned off, thereby applying voltage V to V phase at neutral point 214, applying voltage −V to W phase at neutral point 214, and causing a current to flow from V phase to W phase.

In energization mode (4), control is performed such that switching elements 217b and 217c are turned on and all the other switching elements are turned off, thereby applying voltage V to V phase at neutral point 214, applying voltage −V to U phase at neutral point 214, and causing a current to flow from V phase to U phase.

In energization mode (5), control is performed such that switching elements 217b and 217e are turned on and all the other switching elements are turned off, thereby applying voltage V to W phase at neutral point 214, applying voltage −V to U phase at neutral point 214, and causing a current to flow from W phase to U phase.

In energization mode (6), control is performed such that switching elements 217e and 217d are turned on and all the other switching elements are turned off, thereby applying voltage V to W phase at neutral point 214, applying voltage −V to V phase at neutral point 214, and causing a current to flow from W phase to V phase.

In such energization control, energization mode (1) for example performs control such that switching elements 217a and 217d are turned on and all the others are turned off, thereby applying voltage V and voltage −V to U and V phases respectively, and causing a current to flow from U phase to V phase. However, energization control in each of energization modes (1) to (6) may be performed as follows: upper switching element 217c is driven using a PWM wave in reverse phase to that of a PWM wave used to drive lower switching element 217d; when lower switching element 217d is on, upper switching element 217c is turned off; and when lower switching element 217d is off, upper switching element 217c is turned on.

As described above, by switching six different energization modes (1) to (6) at every 60-deg electric angle, each of switching elements 217a to 217f is energized for an interval of 120 deg of each 240 deg. Therefore, the energization system as illustrated in FIG. 3 is called a 120-degree energization system.

In the present embodiment, switching the energization modes is carried out based on a comparison between a voltage (i.e., induced voltage) generated in a non-energized phase and a voltage threshold, and motor control unit 3 performs so-called position-sensorless control of energization.

Specifically, controller 213 determines whether the terminal voltage in a non-energized phase (open phase) selected from among three phase terminal voltage Vu, Vv, and Vw has passed the voltage threshold according to energization mode. When the terminal voltage of the non-energized phase has passed the voltage threshold (i.e., when the terminal voltage of the non-energized phase equals the voltage threshold) or when the terminal voltage of the non-energized phase has passed the voltage threshold and significantly increased or decreased, controller 213 switches the energization modes.

Figure 4:
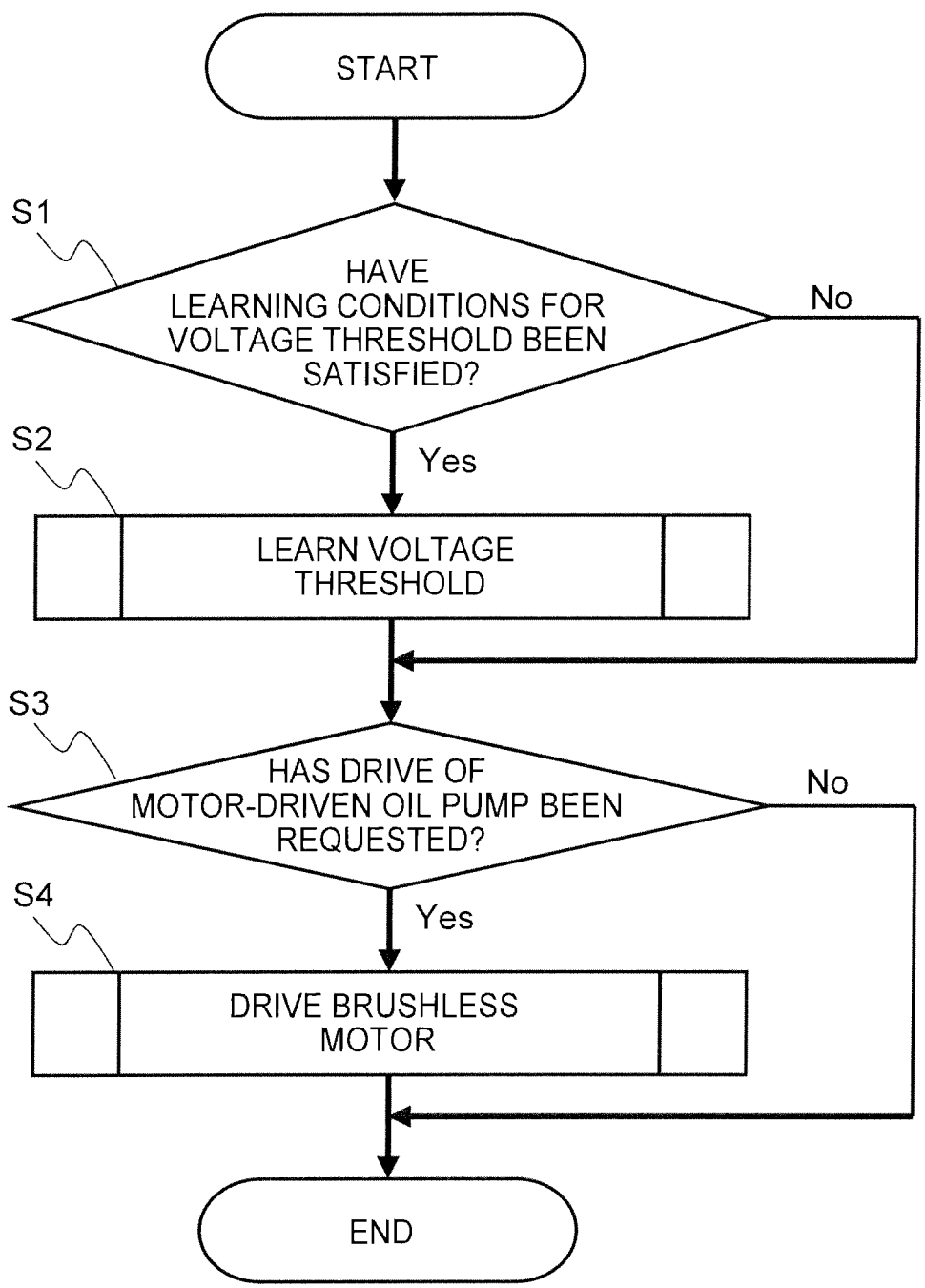
FIG. 4 is a flowchart of brushless motor drive control.

Referring to FIG. 4, drive control for brushless motor 2, which is repeated at intervals of predetermined Δt by controller 213 of motor control unit 3, will be described.

In step 1 (abbreviated to "S1" in the drawings, as also in subsequent steps), the voltage threshold used for the determination of the timing of energization mode switching changes with variation in brushless motor 2, temperature, or the like. In view of such changes, the voltage threshold is determined by learning. Therefore, before driving motor-driven oil pump 1, controller 213 determines whether a learning condition for the voltage threshold has been satisfied or not. Specifically, the learning condition for the voltage threshold is assumed to be as follows: driving of brushless motor 2 has not been requested right after, for example, turning on a power source or right after stopping motor-driven oil pump 1. When controller 213 determines that the learning condition is satisfied, the controller 213 directs processing to proceed to step 2 ("Yes"). When controller 213 determines that the learning condition is not satisfied, controller 213 directs processing to proceed to step 3 ("No").

In step 2, controller 213 carries out a sub-routine for learning the voltage threshold.

In step 3, controller 213 determines, for example, whether an idle stop control function has been requesting to stop idling. To be specific, the determination is made whether AT control system 4 has made a request for driving motor-driven oil pump 1. When determining that driving motor-driven oil pump 1 has been requested, the controller 213 directs the processing to proceed to step 4 ("Yes"). When determining that driving motor-driven oil pump 1 has not been requested, controller 213 terminates the processing ("No"). Although not illustrated in FIG. 4, in a case in which driving motor-driven oil pump 1 is requested in the course of learning carried out in step 2, the learning is terminated and the set voltage threshold is used.

In step 4, controller 213 carries out a sub-routine for driving brushless motor 2.

Figure 5:
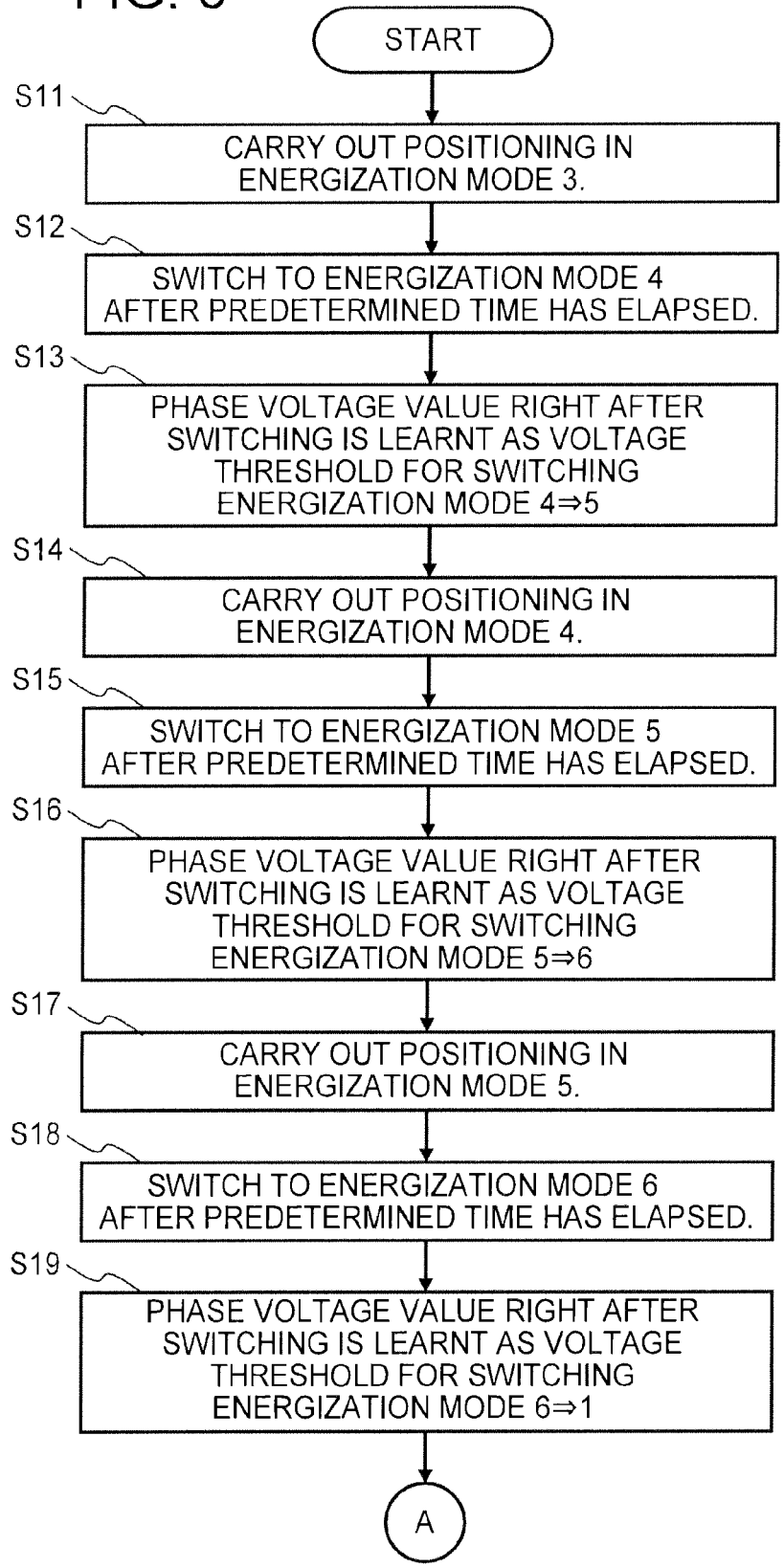
FIG. 5 is a flowchart of a sub-routine for learning a voltage threshold.
Figure 6:
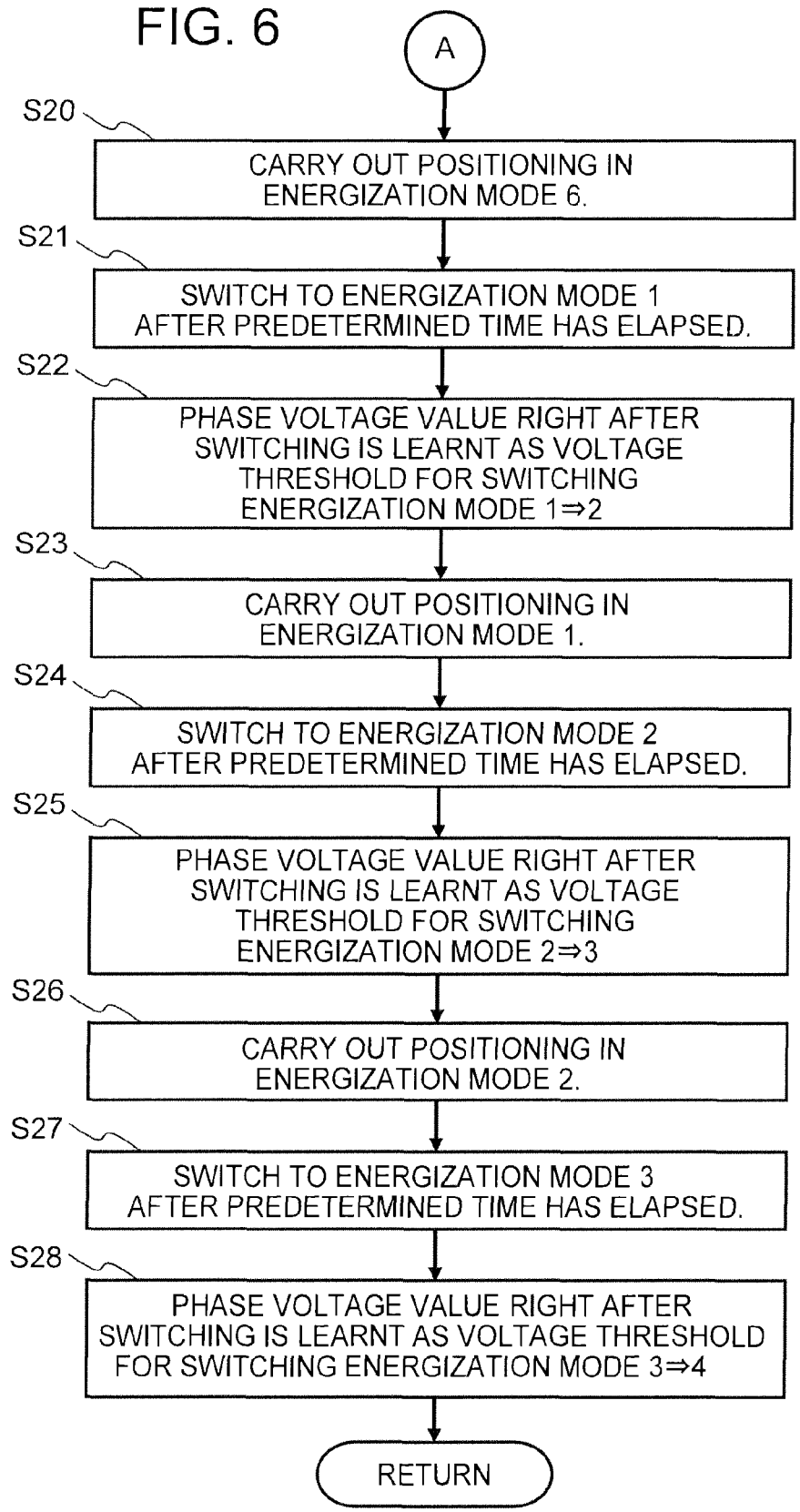
FIG. 6 is a flowchart of a sub-routine for learning a voltage threshold.

FIGS. 5 and 6 illustrate, in detail, the sub-routine for learning a voltage threshold.

In steps 11 to 13, a voltage threshold V4-5 used to determine switching from energization mode (4) to energization mode (5) is learnt. In steps 14 to 16, a voltage threshold V5-6 used to determine switching from energization mode (5) to energization mode (6) is learnt. In steps 17 to 19, a voltage threshold V6-1 used to determine switching from energization mode (6) to energization mode (1) is learnt. In steps 20 to 22, a voltage threshold V1-2 used to determine switching from energization mode (1) to energization mode (2) is learnt. In steps 23 to 25, a voltage threshold V2-3 used to determine switching from energization mode (2) to energization mode (3) is learnt. In steps 26 to 28, a voltage threshold V3-4 used to determine switching from energization mode (3) to energization mode (4) is learnt. Order of the learning of voltage thresholds is arbitrary, and may be changed as necessary.

In step 11, controller 213 positions permanent magnet rotor 216 at an angle corresponding to energization mode (3). Specifically, controller 213 applies voltage corresponding to energization mode (3), that is, Vu=0, Vv=Vin, and Vw=−Vin, to the corresponding phases. By applying the voltage corresponding to energization mode (3) to these phases, permanent magnet rotor 216 is attracted to the combined magnetic fluxes of U, V, and W phases, thereby generating torque. Consequently, the N pole of the permanent magnet rotor 216 rotates to an angle of 90 deg. Incidentally, an angle of 90 deg, which is the angle at which the voltage corresponding to energization mode (3) are applied, is the angular position at which switching from energization mode (4) to energization mode (5) is carried out.

In step 12, controller 213 waits until the maximum operating delay (i.e., standby time) has elapsed. The maximum operating delay is the period of time expected to be required for the N pole of permanent magnet rotor 216 to reach an angular position of 90 deg corresponding to energization mode (3) after controller 213 sets, in step 11, applied voltage Vu, Vv, and Vw corresponding to U, V, and W phases respectively to applied voltage corresponding to energization mode (3). Then, when it can be estimated that permanent magnet rotor 216 has stopped at an angular position of 90 deg, controller 213 switches from applied voltage corresponding to energization mode (3) to applied voltage corresponding to energization mode (4), that is, Vu=−Vin, Vv=Vin, and Vw=0.

In step 13, controller 213 detects terminal voltage Vw in W phase, which is an open phase (non-energized phase) in energization mode (4), obtained right after switching from applied voltage corresponding to energization mode (3) to applied voltage corresponding to energization mode (4). Then, based on a terminal voltage Vw, controller 213 updates voltage threshold V4-5 used to determine switching from energization mode (4) to energization mode (5), and stores updated voltage threshold V4-5. That is, switching from energization mode (4) to energization mode (5) is set so as to take place at an angle of 90 deg. Whether the angle has reached 90 deg or not is determined based on terminal voltage Vw in W phase, which is the open phase (non-energized phase) in energization mode (4).

Here, by continuing application of voltage corresponding to energization mode (3), permanent magnet rotor 216 can be placed in the angular position (90 deg) at which switching from energization mode (4) to energization mode (5) is carried out. Switching from energization mode (3) to energization mode (4) is then carried out in such a state. Thereby, terminal voltage Vw in W phase right after switching indicates terminal voltage V in open phase at an angular position of 90 deg.

Then, based on terminal voltage Vw in W phase right after switching to energization mode (4) from the continued application of voltage corresponding to energization mode (3), voltage threshold V4-5 used to determine switching from energization mode (4) to energization mode (5) is updated and updated V4-5 is stored. Following this, when terminal voltage Vw in W phase, which is the open phase (non-energized phase) of energization mode (4), has passed voltage threshold V4-5 (i.e., when terminal voltage Vw in W phase has become equal to voltage threshold V4-5), switching from energization mode (4) to energization mode (5) is carried out.

In a voltage-threshold updating process, terminal voltage V in open phase, obtained this time, may be stored as it is, as a voltage threshold. Alternatively, the weighted average of voltage thresholds, obtained until the previous voltage threshold, and terminal voltage V in open phase, obtained this time, may be stored as a new voltage threshold. Alternatively, a moving average in terminal voltage V in open phase, obtained two or more times in the past, may be stored as a new voltage threshold.

When terminal voltage V in open phase, obtained this time, falls within a normal range stored in advance, the voltage threshold may be updated based on terminal voltage V in open phase obtained this time. When it falls outside the normal range, updating of the voltage threshold based on terminal voltage V in open phase, obtained this time, may be prohibited, and the previous voltage threshold is held as is. In a non-learning state in which a design value has been stored as the initial value of a voltage threshold and the learning of a voltage threshold has not yet been conducted, the timing of energization mode switching is determined using the initial value (design value) as the voltage threshold. In the case where the terminal voltage in open phase (non-energized phase) is read after Analog/Digital (A/D) conversion at fixed periods, the terminal voltage in open phase, read first time when the terminal voltage in open phase is detected right after energization mode switching, may be used as the terminal voltage in open phase right after switching. However, A/D conversion may be performed in synchronization with energization mode switching.

In step 14, controller 213 positions permanent magnet rotor 216 at an angle corresponding to energization mode (4). Specifically, applied voltage corresponding to energization mode (4), that is, Vu=−Vin, Vv=Vin, and Vw=0, are applied to the corresponding phases. By applying voltage corresponding to energization mode (4) to these phases, permanent magnet rotor 216 is attracted to the combined magnetic fluxes of the U, V, and W phases, thereby generating torque. Consequently, the N pole of permanent magnet rotor 216 rotates to an angle of 150 deg. An angle of 150 deg, which is the angle at which voltage corresponding to energization mode (4) is applied, is the angular position at which switching from energization mode (5) to energization mode (6) is carried out.

In step 15, controller 213 waits until the maximum operating delay (i.e., standby time) has elapsed. The maximum operating delay is the period of time expected to be required for the N pole of permanent magnet rotor 216 to reach an angle of 150 deg corresponding to energization mode (4) after controller 213 sets, in step 14, applied voltage Vu, Vv, and Vw corresponding to U, V, and W phases respectively to applied voltage corresponding to energization mode (4). Then, when it can be estimated that permanent magnet rotor 216 has stopped at an angle of 150 deg, controller 213 switches from applied voltage corresponding to energization mode (4) to applied voltage corresponding to energization mode (5), that is, Vu=−Vin, Vv=0, and Vw=Vin.

In step 16, controller 213 detects terminal voltage Vv in V phase, which is an open phase (non-energized phase) in energization mode (5), obtained right after switching from applied voltage corresponding to energization mode (4) to applied voltage corresponding to energization mode (5). Then, based on terminal voltage Vv, controller 213 updates voltage threshold V5-6 used to determine switching from energization mode (5) to energization mode (6), and stores updated voltage threshold V5-6. That is, switching from energization mode (5) to energization mode (6) is set so as to take place at an angle of 150 deg. Whether the angle has reached to 150 deg or not is determined based on terminal voltage Vv in V phase, which is the open phase (non-energized phase) in energization mode (5).

Here, by continuing application of voltage corresponding to energization mode (4), permanent magnet rotor 216 can be placed at the angular position (150 deg) at which switching from energization mode (5) to energization mode (6) is carried out. Switching from energization mode (4) to energization mode (5) is then carried out in such a state. Thereby, terminal voltage Vv in V phase right after switching indicates terminal voltage V in open phase at an angle of 150 deg.

Then, based on terminal voltage Vv in V phase right after switching to energization mode (5) from continued application of voltage corresponding to energization mode (4), voltage threshold V5-6 used to determine switching from energization mode (5) to energization mode (6) is updated and updated threshold V5-6 is stored. Following this, when terminal voltage Vv in V phase, which is the open phase (non-energized phase) of energization mode (5), has passed voltage threshold V5-6 (i.e., when terminal voltage Vv in V phase has become equal to voltage threshold V5-6), switching from energization mode (5) to energization mode (6) is carried out.

In step 17, controller 213 positions permanent magnet rotor 216 at an angle corresponding to energization mode (5). Specifically, applied voltage corresponding to energization mode (5), that is, Vu=−Vin, Vv=0, and Vw=Vin are applied to the corresponding phases. By applying voltage corresponding to energization mode (5) to these phases, permanent magnet rotor 216 is attracted to the combined magnetic fluxes of the U, V, and W phases, thereby generating torque. Consequently, the N pole of permanent magnet rotor 216 rotates to an angle of 210 deg. An angle of 210 deg, which is the angle at which voltage corresponding to energization mode (5) is applied, is the angle at which switching from energization mode (6) to energization mode (1) is carried out.

In step 18, controller 213 waits until the maximum operating delay (i.e., standby time) has elapsed. The maximum operating delay is the period of time expected to be required for the N pole of permanent magnet rotor 216 to reach an angle of 210 deg corresponding to energization mode (5) after controller 213 sets, in step 17, applied voltage Vu, Vv, and Vw corresponding to U, V, and W phases respectively to applied voltage corresponding to energization mode (5). Then, when it is possible to estimate that permanent magnet rotor 216 has stopped at an angular position of 210 deg, controller 213 switches from applied voltage corresponding to energization mode (5) to applied voltage corresponding to energization mode (6), that is, Vu=0, Vv=−Vin, and Vw=Vin.

In step 19, controller 213 detects terminal voltage Vu in U phase, which is an open phase (non-energized phase) in energization mode (6), obtained right after switching from applied voltage corresponding to energization mode (5) to applied voltage corresponding to energization mode (6). Then, based on terminal voltage Vu, controller 213 updates voltage threshold V6-1 used to determine switching from energization mode (6) to energization mode (1), and stores updated voltage threshold V6-1. That is, switching from energization mode (6) to energization mode (1) is set so as to take place at an angle of 210 deg. Whether an angle has reached 210 deg or not is determined based on terminal voltage Vu in U phase, which is the open phase (non-energized phase) in energization mode (6).

Here, by continuing application of voltage corresponding to energization mode (5), permanent magnet rotor 216 can be placed at the angular position (210 deg) at which switching from energization mode (6) to energization mode (1) is carried out. Switching from energization mode (5) to energization mode (6) is then carried out in such a state. Thereby, terminal voltage Vu in U phase right after switching indicates terminal voltage V in open phase at an angular position of 210 deg.

Then, based on terminal voltage Vu in U phase right after switching to energization mode (6) from continued application of voltage corresponding to energization mode (5), voltage threshold V6-1 used to determine switching from energization mode (6) to energization mode (1) is updated and updated V6-1 is stored. Then, when terminal voltage Vu in U phase, which is the open phase (non-energized phase) of energization mode (6), has passed voltage threshold V6-1 (i.e., when terminal voltage Vu in U phase is equal to voltage threshold V6-1), switching from energization mode (6) to energization mode (1) is carried out.

In step 20, controller 213 positions permanent magnet rotor 216 at an angle corresponding to energization mode (6). Specifically, applied voltage corresponding to energization mode (6), that is, Vu=0, Vv=−Vin, and Vw=Vin are applied to the corresponding phases. By applying voltage corresponding to energization mode (6) to these phases, permanent magnet rotor 216 is attracted to the combined magnetic fluxes of the U, V, and W phases, thereby generating torque. Consequently, the N pole of permanent magnet rotor 216 rotates to an angle of 270 deg. An angle of 270 deg, which is the angle at which voltage corresponding to energization mode (6) is applied, is the angular position at which switching from energization mode (1) to energization mode (2) is carried out.

In step 21, controller 213 waits until the maximum operating delay (i.e., standby time) has elapsed. The maximum operating delay is the period of time expected to be required for the N pole of permanent magnet rotor 216 to reach an angle of 270 deg corresponding to energization mode (6) after controller 213 sets, in step 20, applied voltage Vu, Vv, and Vw corresponding to U, V, and W phases respectively to applied voltage corresponding to energization mode (6). Then, when it is possible to estimate that permanent magnet rotor 216 has stopped at an angle of 270 deg, controller 213 switches from applied voltage corresponding to energization mode (6) to applied voltage corresponding to energization mode (1), that is, Vu=Vin, Vv=−Vin, and Vw=0.

In step 22, controller 213 detects terminal voltage Vw in W phase, which is an open phase (non-energized phase) in energization mode (1), obtained right after switching from applied voltage corresponding to energization mode (1) to applied voltage corresponding to energization mode (2). Then, based on terminal voltage Vw, controller 213 updates voltage threshold V1-2 used to determine switching from energization mode (1) to energization mode (2), and stores updated voltage threshold V1-2. That is, switching from energization mode (1) to energization mode (2) is set so as to take place at an angle of 270 deg. Whether the angle has reached 270 deg or not is determined based on terminal voltage Vw in W phase, which is the open phase (non-energized phase) in energization mode (1).

Here, by continuing application of voltage corresponding to energization mode (6), permanent magnet rotor 216 can be placed at the angular position (270 deg) at which switching from energization mode (1) to energization mode (2) is carried out. Switching from energization mode (6) to energization mode (1) is then carried out in such a state. Thereby, terminal voltage Vw in W phase right after switching indicates terminal voltage V in open phase at an angular position of 270 deg.

Then, based on terminal voltage Vw in W phase right after switching to energization mode (1) from continued application of voltage corresponding to energization mode (6), voltage threshold V1-2 used to determine switching from energization mode (1) to energization mode (2) is updated, and updated threshold V1-2 is stored. Then, when terminal voltage Vw in W phase, which is open phase (non-energized phase) of energization mode (1), has passed voltage threshold V1-2 (i.e., when terminal voltage Vw in W phase is equal to voltage threshold V1-2), switching from energization mode (1) to energization mode (2) is carried out.

In step 23, controller 213 positions permanent magnet rotor 216 at an angle corresponding to energization mode (1). Specifically, applied voltage corresponding to energization mode (1), that is, Vu=Vin, Vv=−Vin, and Vw=0 are applied to the corresponding phases. By applying voltage corresponding to energization mode (1) to these phases, permanent magnet rotor 216 is attracted to the combined magnetic fluxes of the U, V, and W phases, thereby generating torque. Consequently, the N pole of permanent magnet rotor 216 rotates to an angle of 330 deg. An angle of 330 deg, which is the angle at which voltage corresponding to energization mode (1) are applied, is the angular position at which switching from energization mode (2) to energization mode (3) is carried out.

In step 24, controller 213 waits until the maximum operating delay (i.e., standby time) has elapsed. The maximum operating delay is the period of time expected to be required for the N pole of permanent magnet rotor 216 to reach an angular position of 330 deg corresponding to energization mode (1) after controller 213 sets, in step 23, applied voltage Vu, Vv, and Vw corresponding to U, V, and W phases respectively to applied voltage corresponding to energization mode (1). Then, when it is possible to estimate that permanent magnet rotor 216 has stopped at an angular position of 330 deg, controller 213 switches from applied voltage corresponding to energization mode (1) to applied voltage corresponding to energization mode (2), that is, Vu=Vin, Vv=0, and Vw=−Vin.

In step 25, controller 213 detects terminal voltage Vv in V phase, which is an open phase (non-energized phase) in energization mode (2), obtained right after switching from applied voltage corresponding to energization mode (1) to applied voltage corresponding to energization mode (2). Then, based on terminal voltage Vv, controller 213 updates voltage threshold V2-3 used to determine switching from energization mode (2) to energization mode (3), and stores updated voltage threshold V2-3. That is, switching from energization mode (2) to energization mode (3) is set so as to take place at an angle of 330 deg. Whether an angle has reached 330 deg or not is determined based on terminal voltage Vv in V phase, which is the open phase (non-energized phase) in energization mode (2).

Here, by continuing application of voltage corresponding to energization mode (1), permanent magnet rotor 216 can be placed at the angular position (330 deg) at which switching from energization mode (2) to energization mode (3) is carried out. Then, switching from energization mode (1) to energization mode (2) is carried out in such a state. Thereby, terminal voltage Vv in V phase right after switching indicates terminal voltage V in open phase at an angular position of 330 deg.

Then, based on terminal voltage Vv in V phase right after switching to energization mode (2) from continued application of voltage corresponding to energization mode (1), voltage threshold V2-3 used to determine switching from energization mode (2) to energization mode (3) is updated and updated threshold V2-3 is stored. Then, when terminal voltage Vv in V phase, which is the open phase (non-energized phase) of energization mode (2), has passed voltage threshold V2-3 (i.e., when terminal voltage Vv in V phase is equal to voltage threshold V2-3), switching from energization mode (2) to energization mode (3) is carried out.

In step 26, controller 213 positions permanent magnet rotor 216 at an angle corresponding to energization mode (2). Specifically, applied voltage corresponding to energization mode (2), that is, Vu=Vin, Vv=0, and Vw=−Vin are applied to the corresponding phases. By applying voltage corresponding to energization mode (2) to these phases, permanent magnet rotor 216 is attracted to the combined magnetic fluxes of the U, V, and W phases, thereby generating torque. Consequently, the N pole of permanent magnet rotor 216 rotates to an angle of 30 deg. An angle of 30 deg, which is the angle at which voltage corresponding to energization mode (2) is applied, is the angular position at which switching from energization mode (3) to energization mode (4) is carried out.

In step 27, controller 213 waits until the maximum operating delay (i.e., standby time) has elapsed. The maximum operating delay is the period of time expected to be required for the N pole of permanent magnet rotor 216 to reach an angular position of 30 deg corresponding to energization mode (2) after controller 213 sets, in step 26, applied voltage Vu, Vv, and Vw corresponding to U, V, and W phases respectively to applied voltage corresponding to energization mode (2). Then, when it is possible to estimate that permanent magnet rotor 216 has stopped at an angle of 30 deg, controller 213 switches from applied voltage corresponding to energization mode (2) to applied voltage corresponding to energization mode (3), that is, Vu=0, Vv=−Vin, and Vw=−Vin.

In step 28, controller 213 detects terminal voltage Vu in U phase, which is an open phase (non-energized phase) in energization mode (3), obtained right after switching from applied voltage corresponding to energization mode (2) to applied voltage corresponding to energization mode (3). Then, based on terminal voltage Vu, controller 213 updates voltage threshold V3-4 used to determine switching from energization mode (3) to energization mode (4), and stores updated voltage threshold V3-4. That is, switching from energization mode (3) to energization mode (4) is set so as to take place at an angle of 30 deg. Whether the angle has reached 30 deg or not is determined based on terminal voltage Vu in U phase, which is the open phase (non-energized phase) in energization mode (3).

Here, by continuing application of voltage corresponding to energization mode (2), permanent magnet rotor 216 can be placed at the angular position (30 deg) at which switching from energization mode (3) to energization mode (4) is carried out. Switching from energization mode (2) to energization mode (3) is then carried out in such a state. Thereby, terminal voltage Vu in U phase right after switching indicates terminal voltage V in open phase at an angle of 30 deg.

Then, based on terminal voltage Vu in U phase right after switching to energization mode (3) from continued application of voltage corresponding to energization mode (2), voltage threshold V3-4 used to determine switching from energization mode (3) to energization mode (4) is updated, and updated voltage threshold V3-4 is stored. Then, when terminal voltage Vu in U phase, which is the open phase (non-energized phase) of energization mode (3), has passed voltage threshold V3-4 (i.e., when terminal voltage Vu in U phase is equal to voltage threshold V3-4), switching from energization mode (3) to energization mode (4) is carried out.

As described above, by holding one of energization modes (1) to (6), permanent magnet rotor 216 is positioned at an angular position in which energization mode switching is carried out. Thus, switching is carried out from the energization mode in which permanent magnet rotor 216 is positioned to the subsequent energization mode. The terminal voltage in open phase right after this switching is learnt as a voltage threshold used when energization mode is switched at the angular position in which permanent magnet rotor 216 is positioned (i.e., when switching is carried out to the subsequent energization mode from the energization mode immediately after this switching).

Therefore, even if terminal voltage in open phase at each angular position in which switching is carried out varies due to variation in detection by a voltage detection circuit, variation in the motor, or a change in environmental conditions such as temperature, voltage thresholds can be corrected sequentially according to these variations. In this way, the timing of energization mode switching is prevented from deviating from the desired angular positions.

Additionally, a voltage threshold is individually learned each time one of the six energization modes is switched. The voltage threshold used to determine timing of energization mode switching is selected depending on the energization mode to which switching is to be carried out. Therefore, even if there is variation in each of the coils in brushless motor 2, switching to each energization mode can be carried out with appropriate timing (i.e., at the desired angular position).

Figure 7:
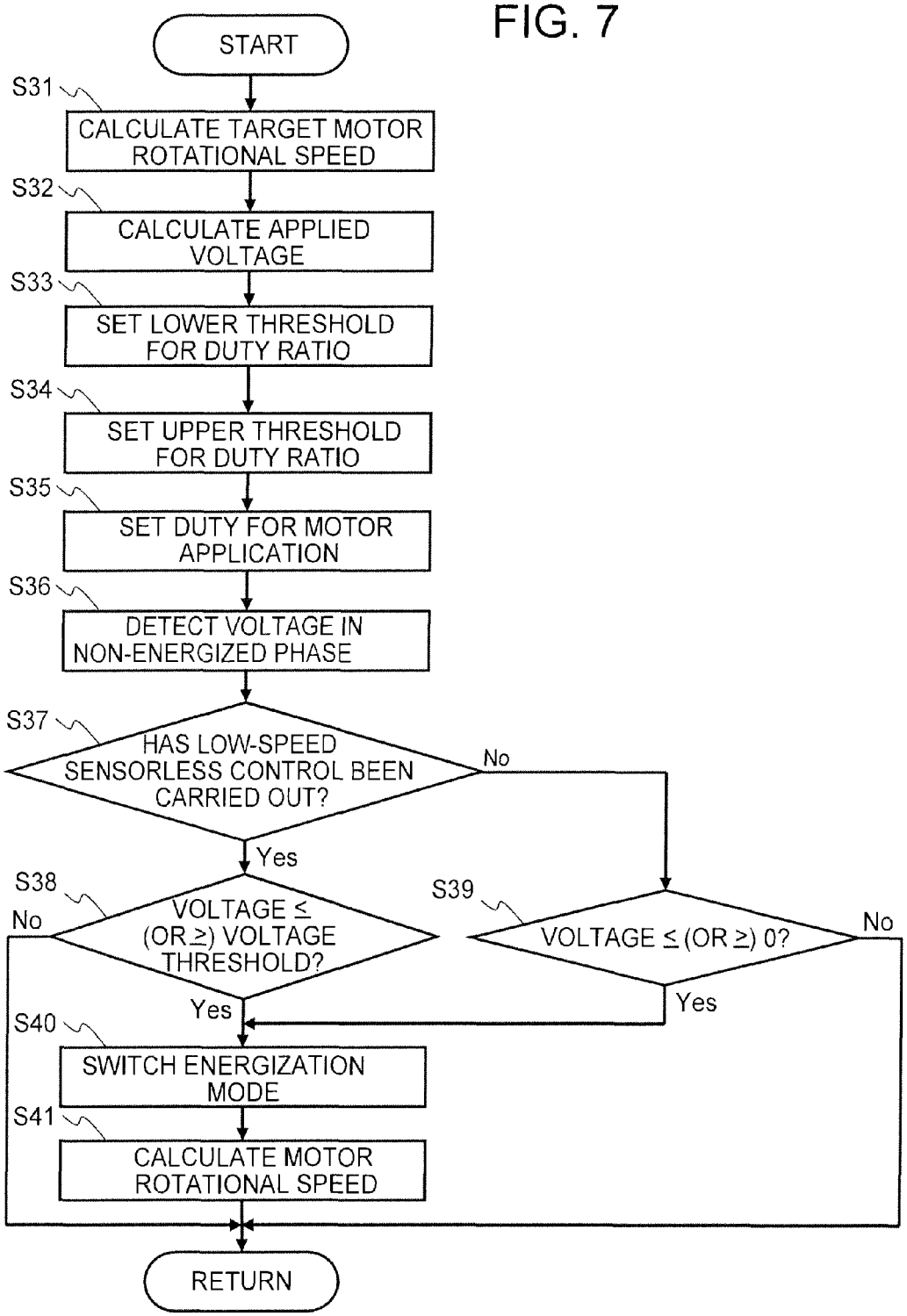
FIG. 7 is a flowchart of a sub-routine for driving a brushless motor.

FIG. 7 illustrates a sub-routine for driving brushless motor 2.

Figure 8:
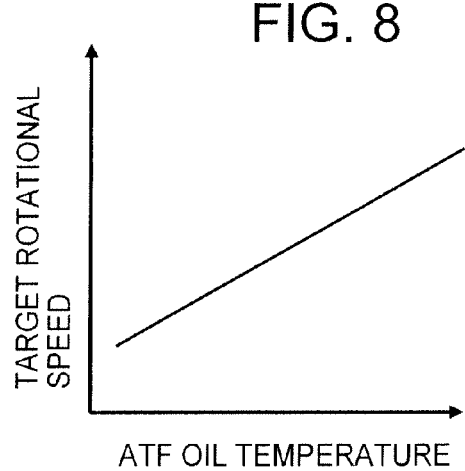
FIG. 8 is a view for explaining a map used for setting a target motor rotational speed.

In step 31, controller 213 refers, for example, to a map in which target rotation speeds corresponding to the temperatures of oil, which is ATF (Automatic Transmission Fluid), are set as illustrated in FIG. 8, and calculates a target rotational speed for brushless motor 2. In the map illustrated in FIG. 8, the target rotational speed increases linearly as the temperature of the oil increases. However, the embodiment is not limited to such a characteristic. Where brushless motor 2 drives a water pump, the target rotational speed may be set higher as the temperature of engine coolant.

In step 32, based on the target rotational speed and actual rotational speed of brushless motor 2, controller 213 calculates a voltage applied to brushless motor 2, in the manner described below. That is, if the expression [rotational speed deviation=target rotational speed−actual rotational speed] is assumed to be used where the applied voltage is PI (Proportional Integral) controlled by rotational feedback, the applied voltage can be obtained from the following expression: [applied voltage=rotational speed deviation×P (Proportional) gain+rotational speed deviation integral value×I (integral) gain]. This is the same for other control systems, such as PID (Proportional Integral Derivative) control. As actual rotational speed, a value calculated in step 41 (described below) is used. However, a detection value obtained by a known sensor may be used.

At this time, in view of the fact that phase electric current and power source electric current are limited, applied voltage is corrected according to the phase electric current and power source electric current. Specifically, the power source electric current uses a detection value obtained by a circuit, and the phase electric current uses an arithmetic value calculated from the expression [phase electric current=power source electric current/duty ratio]. First, the difference between the electric current limit value and the electric current value is calculated from the equation below.

Difference 1=electric current limit value of power source electric current−power source electric current (detected value)

Difference 2=electric current limit value of phase electric current−phase electric current (arithmetic value)

Then, the smaller is selected from differences 1 and 2. If the difference is zero or smaller, the applied voltage is corrected by an electric current limit term obtained by way of multiplying the difference by gain as described below.

Electric current limit term=electric current gain×min (difference 1, difference 2)

In step 33, controller 213 sets the lower threshold for the duty ratio used to make a PWM (Pulse Width Modulation) control on a phase current in a manner as described below.

Figure 9:
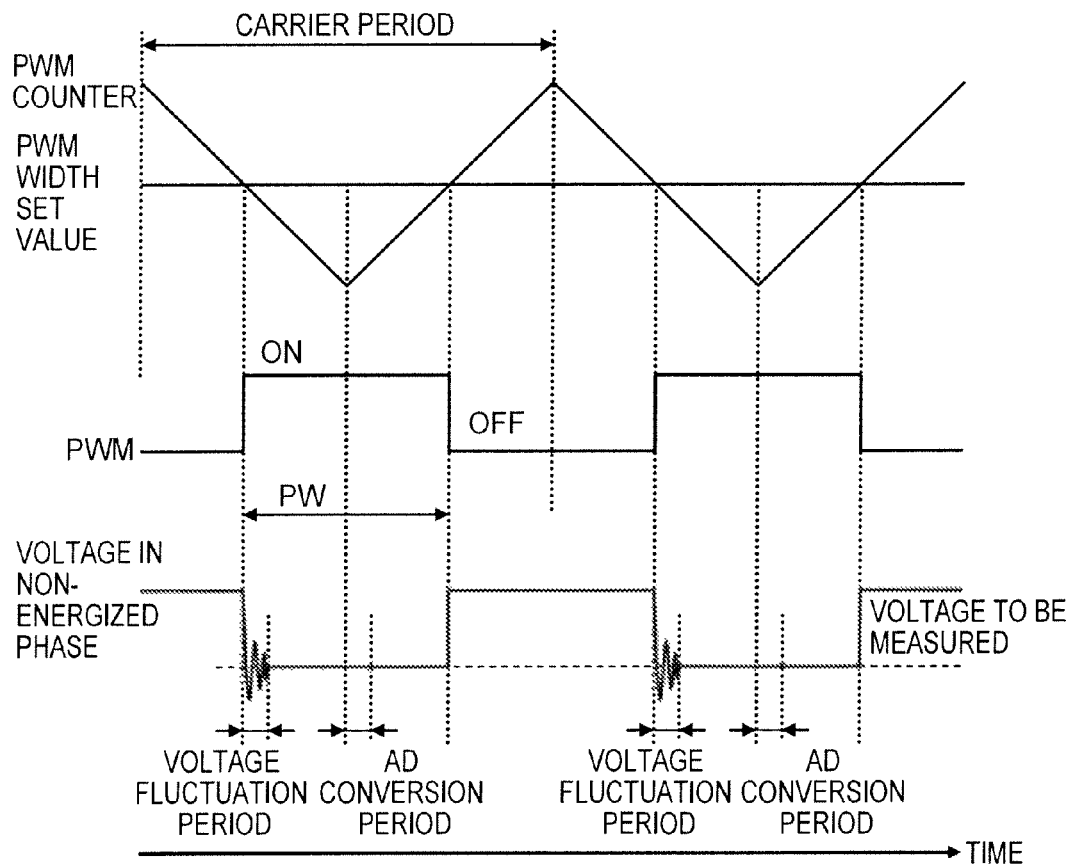
FIG. 9 is a view for explaining a method for setting a lower threshold for the duty ratio.

For example, as illustrated in FIG. 9, the valley of a PWM counter that repeats an increase and a decrease every carrier period in the PWM control (i.e., the point at which the counter value shifts to increase from decrease), in other words, the vicinity of the center of the pulse width PW of a pulse applied voltage is assumed to be an A/D conversion timing (sampling timing) for a non-energized phase. In this case, if the period of time where pulse induced voltage in non-energized phase is fluctuated (i.e., voltage fluctuation time) right after application of a pulse voltage (i.e., right after rising) is longer than ½ of pulse width PW, the A/D conversion (sampling) of the pulse induced voltage in non-energized phase is carried out during the fluctuation of pulse induced voltage. As a result, pulse induced voltage in non-energizations phase cannot be detected accurately. Also, if the time required for an A/D conversion process of pulse induced voltage in non-energized phase (i.e., A/D conversion time from initiation of A/D conversion to termination thereof) is longer than ½ of pulse width PW, application of a voltage for phase energization stops during A/D conversion. In this case also, the pulse induced voltage in non-energized phase cannot be detected accurately, possibly leading to synchronism loss in brushless motor 2.

In view of this, a lower threshold for the duty ratio is calculated according to the expression given below.

Lower threshold=max (voltage fluctuation time, A/D conversion time)×2/carrier period×100

According to this expression, twice the voltage fluctuation time or A/D conversion time, whichever is longer, is used as minimum pulse width PWmin. Accordingly, A/D conversion (sampling) of the pulse induced voltage in non-energized phase is prevented from occurring while the pulse induced voltage is fluctuating. Also, the application of voltage in energized phase is prevented from stopping while A/D conversion is in process.

A lower threshold for the duty ratio is also set in the manner described above in the case where the peak of the PWM counter that repeats an increase and decrease every carrier period in PWM control (i.e., the point at which a counter value shifts from increase to decrease) is used as A/D conversion timing (i.e., sampling timing) for a voltage in non-energized phase or in the case where the PWM switching timing is used as A/D conversion timing (sampling timing) for a voltage in non-energized phase.

In step 34, controller 213 sets an upper threshold for the duty ratio used to make a PWM control on a phase current in a manner as described below.

Figure 10:
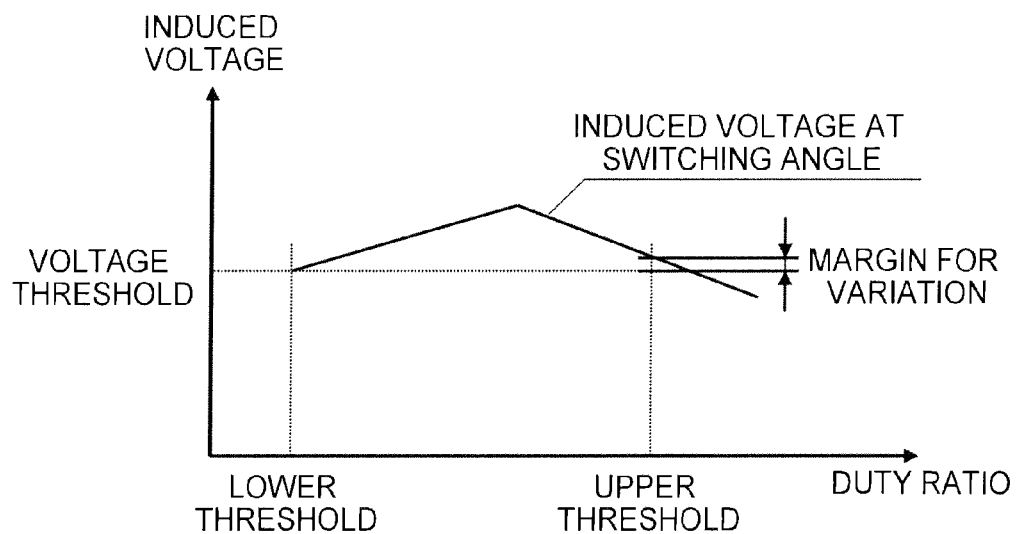
FIG. 10 is a view for explaining a method for setting an upper threshold for the duty ratio.

That is, as illustrated in FIG. 10, induced voltage when the duty ratio for PWM-controlling brushless motor 2 is changed is obtained in advance. Based on the relation between the voltage threshold and the induced voltage, an upper threshold for the duty ratio is set. Specifically, based on the duty ratio at which the voltage threshold and the induced voltage are equal, a duty ratio causing an induced voltage with, taking account of variation, about a 10% margin, for example, with respect to the voltage threshold, is set as an upper threshold for the duty ratio. In this case, each induced voltage may be obtained through learning. Alternatively, the average of N number of induced voltage or the minimum induced voltage may be used.

By regulating the upper threshold of the duty ratio in such a manner, the rate of change in magnetic flux between energized phases decreases, preventing any decrease in induced voltage. As a result, switching of energization modes for brushless motor 2 takes place with appropriate timing. Accordingly, synchronism loss in brushless motor 2 can be prevented.

Figure 11:
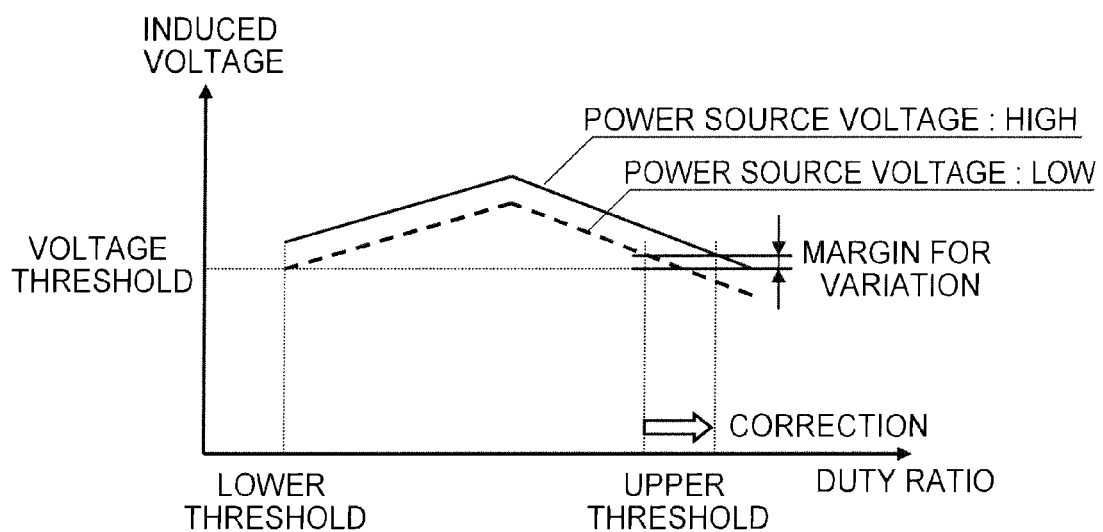
FIG. 11 is a view for explaining a method for correcting the upper threshold of the duty ratio according to a power source voltage.
Figure 12:
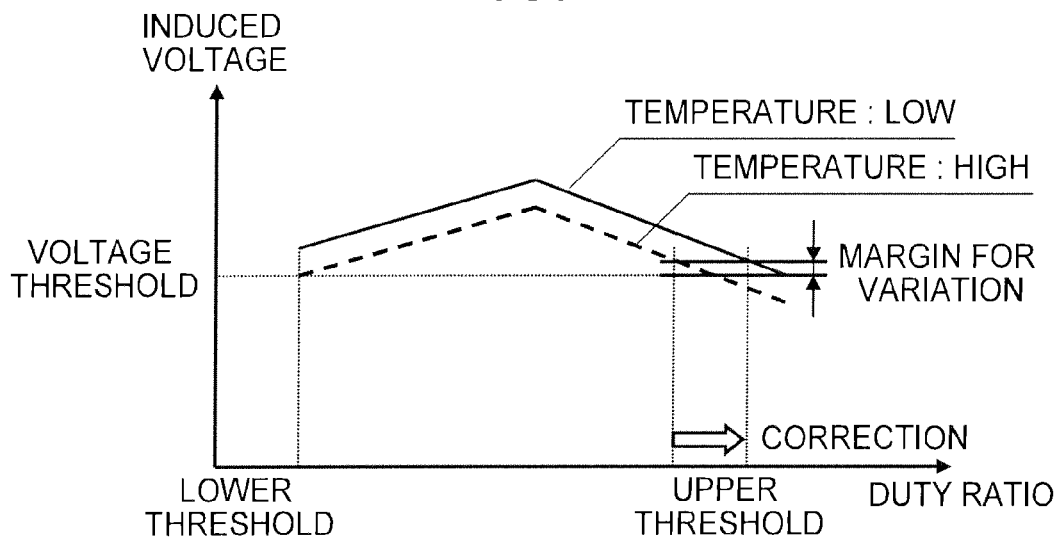
FIG. 12 is a view for explaining a method for correcting the upper threshold of the duty ratio according to temperature.

Additionally, the upper threshold for the duty ratio thus set is corrected according to at least one of the power source voltage and temperature. That is, if power source voltage is high, the induced voltage is higher compared to where power the source voltage is low, as illustrated in FIG. 11. For this reason, a correction is made such that, as the deviation of the induced voltage corresponding to power source voltage from the voltage threshold increases, the upper threshold for the duty ratio is further increased while a margin for variation is ensured. Conversely, when motor temperature is low, the induced voltage is higher compared to the case where motor temperature is high, as illustrated in FIG. 12. For this reason, a correction is made such that, as the deviation of induced voltage corresponding to motor temperature from the voltage threshold increases, the upper threshold for the duty ratio is further increased while a margin for variation is ensured. Here, the motor temperature may be the rotor temperature of brushless motor 2 or a temperature relating to the rotor temperature, for example, the ATF oil temperature. Incidentally, since the duty ratio increases with phase current, a correction by the phase current is also possible. However, here, it is assumed that the phase current is substantially constant during the electric current limitation.

Thus, even if the induced voltage changes with a change in power source voltage or motor temperature, the upper threshold for the duty ratio is corrected so as to compensate for this change. As a result, switching energization modes for brushless motor 2 is prevented from deviating from appropriate timing. Accordingly, synchronism loss in brushless motor 2 can be more reliably prevented.

In step 35, controller 213 sets a motor application duty (i.e., a duty ratio) based on the applied voltage (input voltage) set in step 32, the lower threshold for the duty ratio set in step 33, and the upper threshold for the duty ratio set in step 34.

First, a basic duty [%] is calculated from the expression [basic duty=applied voltage/power source voltage×100]. Then, if the basic duty is above the lower threshold, the basic duty is assigned as a motor application duty; if the basic duty is below the lower threshold, the lower threshold is assigned as a motor application duty. Thereby, the motor application duty is limited so as not to decrease below the lower threshold. Additionally, if the basic duty is above the upper threshold, the upper threshold is assigned as the motor application duty; if the basic duty is below the upper threshold, the basic duty is assigned as the motor application duty. Thereby, the motor application duty is limited so as not to increase above the upper threshold. That is, the motor application duty is limited so as to fall within a range defined by the upper and lower thresholds.

In a hydraulic pump system as in the present embodiment, highly accurate control of motor rotational speed is not required, and a voltage higher than a requested level is applied. Accordingly, even if the duty ratio is limited, a quantity of discharged oil larger than a requested quantity can be ensured, thus preventing hydraulic pressure decrease, lubrication insufficiency, etc. Where brushless motor 2 drives a water pump, a quantity of circulated coolant larger than at least a requested quantity can be ensured even if the duty ratio is limited, thus enabling the prevention of engine overheating.

Incidentally, high speed sensorless control with less synchronism loss in brushless motor 2 does not have to use the control according to the present embodiment.

In step 36, controller 213 detects a voltage in non-energized phase in a currently used energization mode. Specifically, in energization mode (1), controller 213 detects a W-phase voltage; in energization mode (2), a V-phase voltage; in energization mode (3), a U-phase voltage; in energization mode (4), a W-phase voltage; in energization mode (5), a V-phase voltage; and in energization mode (6), a U-phase voltage.

Figure 13:
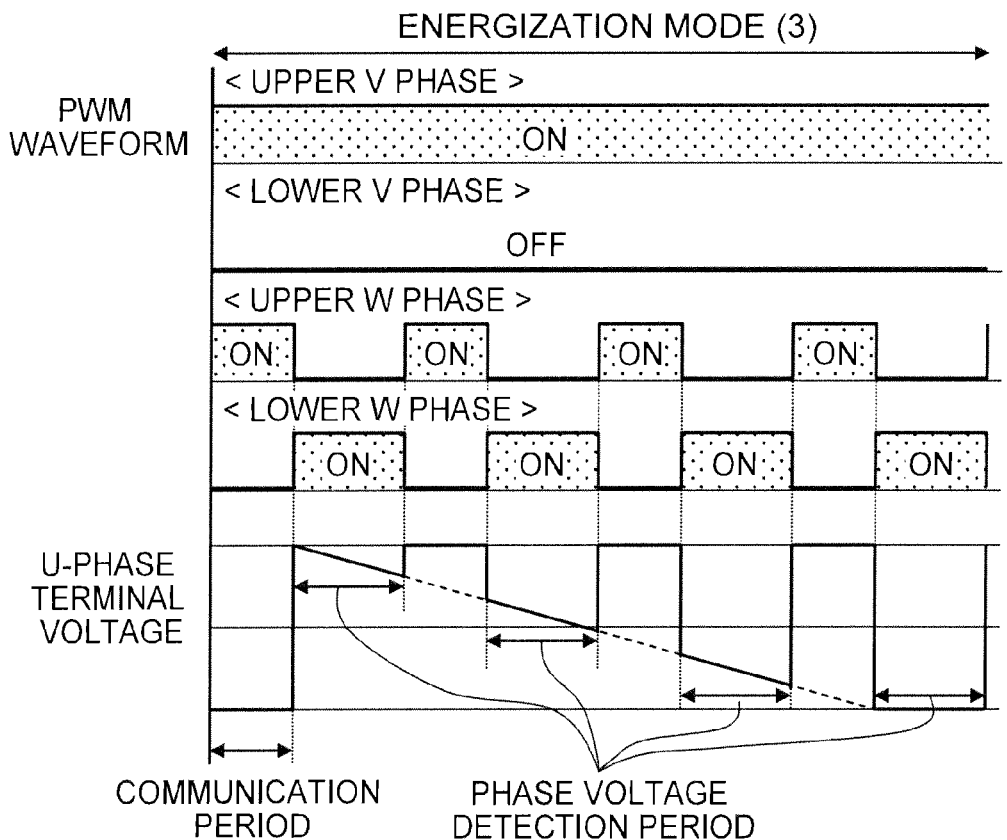
FIG. 13 is a view for explaining phase voltage detection periods in a non-energized phase.

Now, referring to FIG. 13, a period of time where a terminal voltage in non-energized phase is detected will be described using energization mode (3) as an example. In energization mode (3), voltage V is applied to the V phase, voltage −V which corresponds to an instruction voltage is applied to the W phase by pulse width modulation, and a current is caused to flow from the V phase to W phase. Therefore, the voltage detection phase is the U phase, and the phase terminal voltage in the U phase is detected in the on-period of switching element 217f in lower W-phase.

Right after energization mode switching, communication electric current is generated. If voltage detected in the interval of the communication electric current generation is used, the timing of energization mode switching may be erroneously determined. Therefore, the voltage detection value obtained in a predetermined number of times following the energization mode switching is not used to determine the timing for switching. The predetermined number of times may be variably set according to a motor rotational speed and electric current (motor load). The higher the motor rotational speed and the higher the motor current, the greater value is set as the predetermined number of times.

In step 37, controller 213 determines whether conditions for performing low-speed sensorless control have been satisfied or not. In sensorless control in which energization mode switching is triggered by the signal of induced voltage (i.e., speed electromotive force) generated in a non-energized phase, induced voltage (speed electromotive force) lessens in an area where motor rotational speed is low. This makes it difficult to accurately detect timing of switching. Therefore, in an area where a motor rotational speed is low, timing of switching is determined based on a comparison of the pulse induced voltage with the voltage threshold. Accordingly, whether the conditions for performing low speed sensorless control have been satisfied or not is based on whether the motor rotational speed is equal to or lower than a predetermined rotational speed or not. The predetermined rotational speed is the minimum value of the motor rotational speed at which switching can be determined using the speed electromotive force as a trigger. This predetermined rotational speed is predetermined based on, for example, an experiment, a simulation, or the like. Then, when the conditions for performing low-speed sensorless control have been satisfied, controller 213 directs the process to step 38 ("Yes"); when these conditions have not been satisfied, controller 213 directs the process to step 39 ("No").

The motor rotational speed is calculated based on an energization mode switching period. For example, a first rotational speed for determining shifting to low-speed sensorless control and a second rotational speed (higher than the first) for determining stopping of low-speed sensorless control may be set as the predetermined rotational speeds in order to provide so-called "hysteresis," thus preventing sensorless control from being repeated within a short time.

If risk of synchronism loss in brushless motor 2 is less where energization mode switching is carried out using the speed electromotive force generated in a non-energized phase, setting an upper threshold for the duty ratio is not required.

In step 38, controller 213 determines whether or not it is a timing of switching energization mode based on the voltage in non-energized phase and a voltage threshold. Specifically, in the case of energization mode (1), the point when the voltage in W phase, which is a non-energized phase, is equal to voltage threshold V1-2 or below is determined as the timing for switching to energization mode (2). In the case of energization mode (2), the point when the voltage in V phase, which is a non-energized phase, is equal to voltage threshold V2-3 or above is determined as the timing for switching to energization mode (3). In the case of energization mode (3), the point when the voltage in U phase, which is a non-energized phase, is equal to voltage threshold V3-4 or below is determined as the timing for switching to energization mode (4). In the case of energization mode (4), the point when the voltage in W phase, which is a non-energized phase, is equal to voltage threshold V4-5 or above is determined as the timing for switching to energization mode (5). In the case of energization mode (5), the point when the voltage in V phase, which is a non-energized phase, is equal to voltage threshold V5-6 or below is determined as the timing for switching to energization mode (6). In the case of energization mode (6), the point when the voltage in U phase, which is a non-energized phase, is equal to voltage threshold V6-1 or above is determined as the timing for switching to energization mode (1). Then, if the point is determined as the timing of switching energization mode, controller 213 directs the process to step 40 ("Yes"); if the point is not determined as the timing of switching energization mode, controller 213 terminates the process ("No").

In step 39, based on the voltage in non-energized phase, controller 213 determines whether or not it is a timing of switching energization mode. Specifically, in the case of energization mode (1), (3), or (5), the point when voltage in the corresponding non-energized phase has become 0[V] or below and permanent magnet rotor 216 has further rotated by 30 deg since then is determined as the timing for switching to subsequent energization mode (2), (4), or (6). In the case of energization mode (2), (4), or (6), the point when voltage in the corresponding non-energized phase has become 0[V] or above and permanent magnet rotor 216 has further rotated by 30 deg since then is determined as the timing for switching to subsequent energization mode (3), (5), or (1). Then, if the point is determined as the timing of switching energization mode, controller 213 directs the process to step 40 ("Yes"); if the point is determined as the timing of switching energization mode, controller 213 terminates the process ("No").

In step 40, controller 213 switches to the subsequent energization mode. Specifically, in the case of energization mode (1), switching to energization mode (2) is carried out. Similarly, in the case of energization mode (2), switching to energization mode (3) is carried out; in the case of energization mode (3), to energization mode (4); in the case of energization mode (4), to energization mode (5); in the case of energization mode (5), to energization mode (6); and in the case of energization mode (6), to energization mode (1).

In step 41, based on the energization mode switching period, controller 213 calculates the rotational speed of brushless motor 2. Specifically, time intervals of energization mode switching are measured, and rotational speed is calculated from the time intervals. For example, if the number of pairs of poles of brushless motor 2 is 3, rotational speed is found from the expression [rotational speed=60/3/time intervals].

The embodiment described above may include functions as described below.

Figure 14:
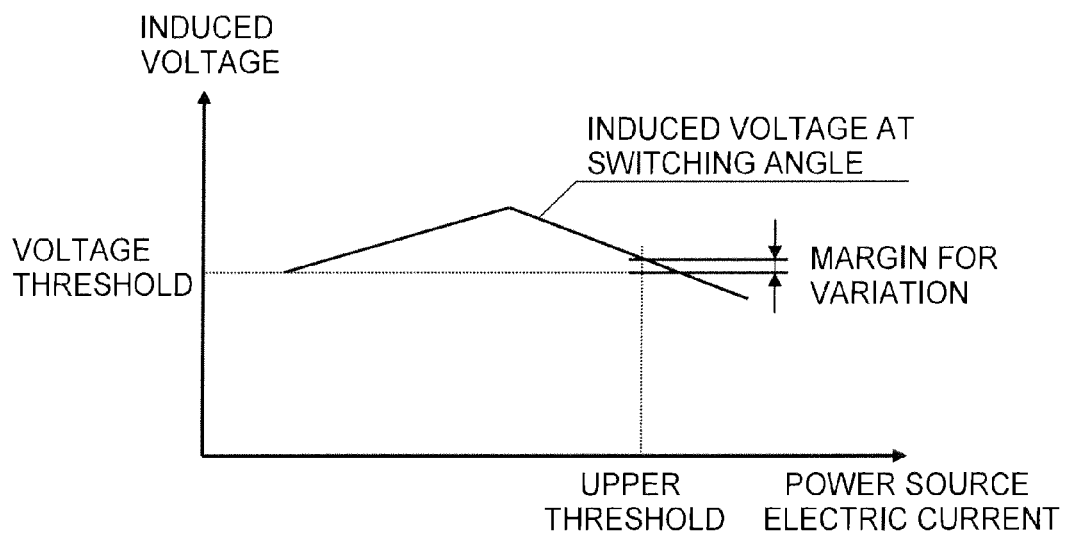
FIG. 14 is a view for explaining a method for setting an upper threshold for an applied voltage.

When power source electric current increases, as illustrated in FIG. 14, where low-speed sensorless control is performed, an induced voltage in non-energized phase gradually decreases to where it falls below the voltage threshold. To avoid this, a power source electric current corresponding to the duty ratio used to make a PWM-control on brushless motor 2 is obtained in advance; while a margin for variation is provided, the upper threshold of an applied voltage is regulated so as to prevent power source electric current from equaling or exceeding a first predetermined value. In this case, the first predetermined value may be a power source electric current corresponding to, for example, the upper threshold of the duty ratio, set in step 34. The upper threshold of the applied voltage may be corrected based on at least one of the power source voltage and temperature in the same manner as the upper threshold of the duty ratio.

Figure 15:
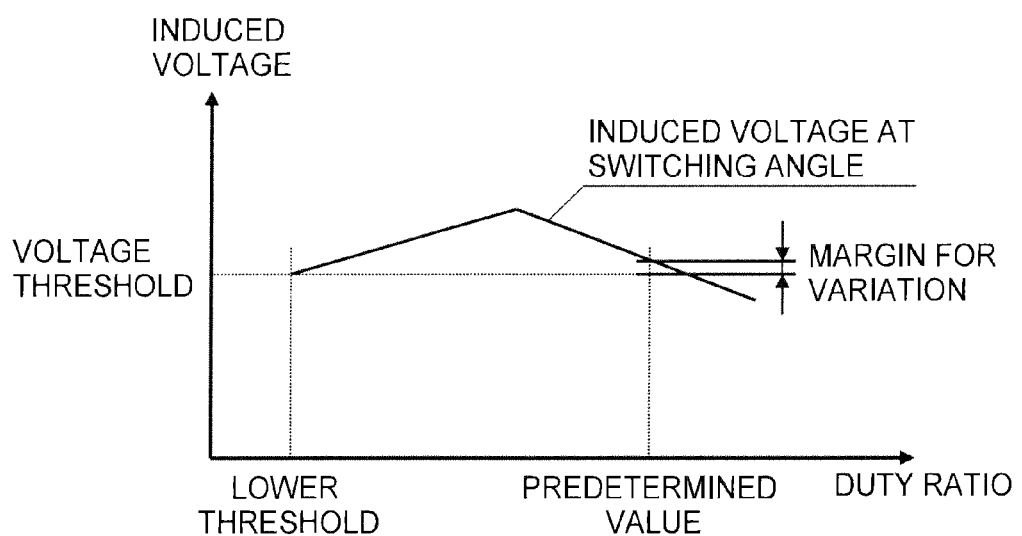
FIG. 15 is a view explaining a method for correcting a voltage threshold according to the duty ratio.

As illustrated in FIG. 15, when the duty ratio for making the PWM-control on brushless motor 2 exceeds a second predetermined value, the induced voltage in the non-energized phase gradually decreases to where it falls below the voltage threshold. To avoid this, if the duty ratio exceeds the second predetermined value, the voltage threshold is gradually decreased. In this case, the second predetermined value may be equivalent to, for example, the upper threshold of the duty ratio, set in step 34.

In the case in which brushless motor 2 stops, the voltage threshold may be decreased by a predetermined proportion as brushless motor 2 is actuated again. This makes it possible to restart brushless motor 2 smoothly.

The foregoing embodiment has been described based on the assumption of a three-phase brushless motor. However, the number of phases is not limited to three but other numbers of phases may be used.

The entire contents of Japanese Patent Application No. 2011-205654, filed Sep. 21, 2011, are incorporated herein by reference.

While only a select embodiment have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention, the invention as claimed in the appended claims and their equivalents.

What is claimed is:

1. A brushless motor driving apparatus that rotates and drives a brushless motor, which has a plurality of coils,
   wherein the brushless motor driving apparatus rotates and drives the brushless motor by switching energization modes corresponding to phases of the brushless motor, and comprises a computer configured to:
   sequentially switch the energization modes based on a non-energized phase voltage and a voltage threshold,
   regulate an upper limit for an energization amount causing an induced voltage greater than the voltage threshold, based on the voltage threshold and a change in the non-energized phase voltage at a time of switching the energization mode, and
   prohibit setting the voltage threshold when a non-energized phase voltage obtained immediately after switching the energization mode falls outside of a predetermined range.

2. The brushless motor driving apparatus according to claim 1, wherein the computer is configured to set the voltage threshold based on the non-energization voltage at the time of switching from a state in which the brushless motor is kept stopped while one energization mode is continued, to a subsequent energization mode.

3. The brushless motor driving apparatus according to claim 2, wherein a design value has been set in advance as an initial value for the voltage threshold.

4. The brushless motor driving apparatus according to claim 1, wherein the computer is configured to correct the upper limit of the energization amount based on at least one of a power source voltage and a temperature of the brushless motor.

5. The brushless motor driving apparatus according to claim 1, wherein, when the brushless motor is driven under low-speed sensorless control, the computer is configured to regulate a voltage applied to the brushless motor so as to prevent a power source electric current from increasing to or exceeding an electric current corresponding to the upper limit of the energization amount.

6. The brushless motor driving apparatus according to claim 5, wherein the computer is configured to correct the voltage applied to the brushless motor based on at least one of a power source voltage and a temperature of the brushless motor.

7. The brushless motor driving apparatus according to claim 1, wherein, when the energization amount of the brushless motor exceeds a predetermined value, the computer is configured to gradually decrease the voltage threshold.

8. The brushless motor driving apparatus according to claim 1, wherein, when the brushless motor stops, the computer is configured to decrease the voltage threshold by a predetermined proportion thereof when the brushless motor is actuated again.

9. The brushless motor driving apparatus according to claim 1, wherein the computer is configured to regulate the upper limit of the energization amount only when the brushless motor rotates at a predetermined rotational speed or lower.

10. A brushless motor driving apparatus that rotates and drives a brushless motor, which has a plurality of coils,
    wherein the brushless motor driving apparatus rotates and drives the brushless motor by switching energization modes corresponding to phases of the brushless motor, and comprises a computer configured to:
    sequentially switch the energization modes based on a non-energized phase voltage and a voltage threshold,
    regulate an upper limit for an energization amount causing an induced voltage greater than the voltage threshold, based on the voltage threshold and a change in the non-energized phase voltage at a time of switching the energization mode, and
    adjust the upper limit of the energization amount based at least on a temperature of the brushless motor.

11. The brushless motor driving apparatus according to claim 10, wherein the computer is configured to set the voltage threshold based on the non-energization voltage at the time of switching from a state in which the brushless motor is kept stopped while one energization mode is continued, to a subsequent energization mode.

12. The brushless motor driving apparatus according to claim 11, wherein, when the non-energized phase voltage obtained right after the energization mode is switched falls outside a predetermined range, the computer is configured to prohibit the setting of the voltage threshold.

13. The brushless motor driving apparatus according to claim 11, wherein a design value has been set in advance as an initial value for the voltage threshold.

14. The brushless motor driving apparatus according to claim 10, wherein the computer is configured to correct the upper limit of the energization amount based on a power source voltage and the temperature of the brushless motor.

15. The brushless motor driving apparatus according to claim 10, wherein, when the brushless motor is driven under low-speed sensorless control, the computer is configured to regulate a voltage applied to the brushless motor so as to prevent a power source electric current from increasing to or exceeding an electric current corresponding to the upper limit of the energization amount.

16. The brushless motor driving apparatus according to claim 15, wherein the computer is configured to correct the voltage applied to the brushless motor based on at least one of a power source voltage and a temperature of the brushless motor.

17. The brushless motor driving apparatus according to claim 10, wherein, when the energization amount of the brushless motor exceeds a predetermined value, the computer is configured to gradually decrease the voltage threshold.

18. The brushless motor driving apparatus according to claim 10, wherein, when the brushless motor stops, the computer is configured to decrease the voltage threshold by a predetermined proportion thereof when the brushless motor is actuated again.

19. The brushless motor driving apparatus according to claim 10, wherein the computer is configured to regulate the upper limit of the energization amount only when the brushless motor rotates at a predetermined rotational speed or lower.

* * * * *